(12) United States Patent
Levey et al.

(10) Patent No.: US 7,870,646 B2
(45) Date of Patent: Jan. 18, 2011

(54) IN-MOLD HINGE ASSEMBLY AND METHOD OF FABRICATING THE SAME

(75) Inventors: Kenneth R. Levey, West Chicago, IL (US); Eric G. Parker, Chicago, IL (US); Bo Yang, Des Plaines, IL (US)

(73) Assignee: Illinois Tool Works Inc., Glenview, IL (US)

( * ) Notice: Subject to any disclaimer, the term of this patent is extended or adjusted under 35 U.S.C. 154(b) by 400 days.

(21) Appl. No.: 12/034,131

(22) Filed: Feb. 20, 2008

(65) Prior Publication Data

US 2008/0263821 A1 Oct. 30, 2008

Related U.S. Application Data

(60) Provisional application No. 60/926,212, filed on Apr. 25, 2007.

(51) Int. Cl.
*E05D 11/00* (2006.01)
*E05D 5/10* (2006.01)

(52) U.S. Cl. .............................. 16/374; 16/222; 16/386; 16/387; 16/DIG. 13; 264/138

(58) Field of Classification Search ................... 16/222, 16/254, 374, 385–387, 380, 366, 367; 264/138, 264/242, 328.1, 273–279, 271.1
See application file for complete search history.

(56) References Cited

U.S. PATENT DOCUMENTS

| 5,669,106 | A | * | 9/1997 | Daoud | ........................ | 16/266 |
| 5,669,695 | A | | 9/1997 | Parker et al. | | |
| 6,053,458 | A | | 4/2000 | Meyer | | |
| 6,154,927 | A | * | 12/2000 | Oi et al. | ........................ | 16/386 |
| 6,667,002 | B1 | * | 12/2003 | Meyer | ........................ | 264/138 |
| 2004/0244145 | A1 | * | 12/2004 | Anscher | ...................... | 16/222 |
| 2004/0244149 | A1 | * | 12/2004 | Anscher | ...................... | 16/386 |
| 2005/0210631 | A1 | * | 9/2005 | Anscher | ...................... | 16/386 |
| 2008/0134466 | A1 | * | 6/2008 | Massengill | .................. | 16/222 |

* cited by examiner

*Primary Examiner*—Chuck Y. Mah
(74) *Attorney, Agent, or Firm*—Mark W. Croll; Paul F. Donovan

(57) ABSTRACT

A molded hinge assembly is provided. The molded hinge assembly includes a male portion, a female portion formed unitarily with the male portion, a swivel shaft formed unitarily with the male portion, the swivel shaft including a plurality of channels defined along a rotational axis thereof. The molded hinge assembly also includes a plurality of molding gates formed at an intersection between each respective channel and the female portion, the female portion being subsequently rotatable with respect to the male portion after the molding gates are broken. During operation, the swivel shaft is friction fit within the female portion after the subsequent rotation of the female portion to break the molding gates.

28 Claims, 7 Drawing Sheets

IN-MOLD HINGE ASSEMBLY AND METHOD OF FABRICATING THE SAME

CROSS REFERENCE TO RELATED APPLICATION

This Non-Provisional Application claims benefit to U.S. Provisional Application Ser. No. 60/926,212 filed on Apr. 25, 2007, the complete subject matter of which is expressly incorporated herein in its entirety.

BACKGROUND OF THE INVENTION

The present invention relates generally to hinges, and more particularly to hinges fabricated using an injection molding process.

At least some known hinges includes three metallic components, i.e. a base element, a swivel hinge, and a hinge pin coupling the base element to the swivel hinge. The three components are molded separately and then assembled to form the hinge.

Another exemplary hinge is fabricated using an injection molding process. To fabricate the hinge, a molding material, such as plastic, is molded under high temperature and pressure. The molding material typically fills-out the mold to form the hinge. The molded hinge includes a swivel element having at least two openings extending therethrough. The molded hinge also includes a base element having a swivel shaft which is journaled for rotation within the two openings. The openings include a plurality of fingers that extend radially around the openings. The radial fingers position the swivel shaft and are also formed as molding gates for molding windows. After the molding process is completed, the radially extending fingers or vestiges are broken to allow the swivel element to rotate with respect to the base element.

While the molded hinge is useful in a variety of applications, the molding process results in increased clearances between the openings and the swivel shaft. More specifically, the molding process causes a small quantity of excess or residual molding material to be deposited in an area defined between the base element openings and the swivel shaft ends. This material is generally referred to as vestiges. After the molding process is completed, the residual molding material or vestiges are "broken" to form the hinge assembly. During operation, the vestiges or fingers function as journals to maintain a position of the swivel shaft within the swivel element. However, since the vestiges are used to position the swivel shaft during operation, additional movement between the swivel element and the base element is introduced between the two elements. As a result, the overall torque which may be applied to the hinge assembly during operation is reduced.

A need remains for a hinge assembly that provides the benefits of a molded hinge, while also increasing the torque which may be applied to the hinge during operation.

BRIEF DESCRIPTION OF THE INVENTION

In one embodiment, a molded hinge assembly is provided. The molded hinge assembly includes a male portion, a female portion formed unitarily with the male portion, a swivel shaft formed unitarily with the male portion. The swivel shaft includes a plurality of channels defined along a rotational axis thereof. The molded hinge assembly also includes a plurality of molding gates formed at an intersection between each respective channel and the female portion. The female is subsequently rotatable with respect to the male portion after the molding gates are broken. During operation, the swivel shaft is friction fit within the female portion after the subsequent rotation of the female portion to break the molding gates.

In another embodiment, a method of fabricating a molded hinge assembly is provided. The method includes injecting a molding material into a mold assembly to form the hinge assembly including a female portion, a male portion that is formed unitarily with the female portion, and a swivel shaft having a plurality of channels defined along a rotational axis thereof that is formed unitarily with the male portion. The method also includes removing the hinge assembly from the mold, and rotating at least one of the female portion and the male portion to break a plurality of molding gates formed at an intersection between each respective channel and the female portion to separate the female portion from the male portion and such that the male portion remains rotatably coupled to the female portion. During operation, the swivel shaft is friction fit within the female portion after the subsequent rotation of the female portion to break the molding gates.

In a further embodiment, a vehicular headlamp adjustment mechanism is provided. The vehicular headlamp adjustment mechanism includes a first molded hinge assembly comprising a male portion, a female portion, and a swivel shaft formed unitarily with the male portion, the swivel shaft including a plurality of channels defined along a rotational axis thereof, and a plurality of molding gates formed at an intersection between each respective channel and the female portion. The vehicular headlamp adjustment mechanism also includes a second molded hinge assembly comprising a male portion, a female portion, and a swivel shaft formed unitarily with the male portion, the swivel shaft including a plurality of channels defined along a rotational axis thereof, and a plurality of molding gates formed at an intersection between each respective channel and the female portion, the first hinge being subsequently rotatable with respect to the second hinge after the molding gates are broken.

Other features and advantages of the invention will become apparent to those skilled in the art upon review of the following detailed description, claims and drawings in which like numerals are used to designate like features.

Figure 1:
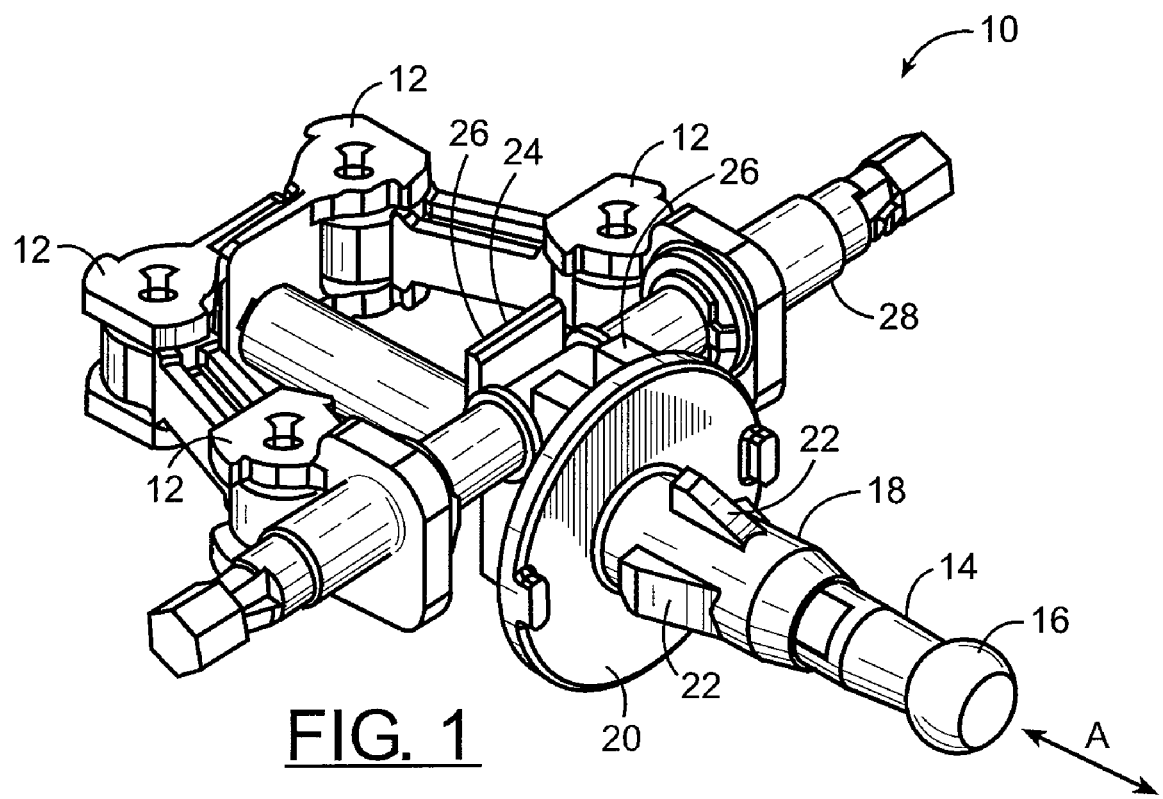
FIG. 1 is a perspective view of an exemplary assembly that includes a plurality of exemplary hinge assemblies in accordance with an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

FIG. 1 is a perspective view of an exemplary assembly 10 that includes a plurality of exemplary hinge assemblies 12 in accordance with an embodiment of the present invention. Although the invention has been described in connection with a headlight assembly and the hinge assemblies are described in connection with an automotive vehicular headlamp adjustment mechanism, the embodiments of the hinge assemblies described herein are capable of use in other applications, and the headlight adjustment mechanism is merely shown and described as an example of one such application.

Assembly 10 includes a ball rod 14 which has a ball element 16 integrally formed upon a free end of the ball rod 14 and which is adapted to be seated within a ball-type pocket or recess, not shown, defined within a vehicular headlamp housing, also not shown. The ball rod 14 imparts the desired adjustment to the headlamp housing as the ball rod 14 is moved in either one of two linear directions, that is, either forwardly or backwardly, as schematically illustrated by means of the double arrowhead A.

The ball rod 14 is slidably disposed within a tubular bushing 18. The bushing 18 includes a circular flange member 20. The outer peripheral surface of the bushing 18 also includes a plurality of ribs, detents, or the like 22. The ribs or detents 22 are circumferentially and equally spaced with respect to each other about the outer periphery of the bushing 18 and are located axially forwardly of the circular flange member 20 so as to be axially spaced there from by a predetermined axial distance or spacing which will correspond to the axial thickness of a support panel, not shown, of the vehicle frame upon which the bushing 18 is able to be mounted. In particular, the vehicle frame support panel will be provided with a plurality of apertures corresponding to the number of ribs or detents 22 provided upon the bushing 18 such that the ribs or detents 22 of the bushing 18 can be inserted through such apertures of the support panel until the rear surface of the support panel abuts the front surface of the circular flange member 20. The bushing 18 can then be rotated a predetermined arcuate extent so as to lock the bushing 18 upon the support panel in a bayonet locking mode.

In view of the disclosure illustrating four circumferentially spaced ribs or detents 22, wherein the ribs or detents 22 will be arcuately spaced with respect to each other by approximately 90 degrees. Thus the bushing 18 is rotated less than 90 degrees in order to affect the bayonet locking mode of the bushing 18 with respect to the vehicle frame support panel. It is to be understood, of course, that if a different number of ribs or detents 22 are utilized, then the circumferential spacing between respective ribs or detents 22 will be accordingly different which, in turn, will lead to a different predetermined amount of rotation of the bushing 18 with respect to the vehicle frame support panel when the bayonet locking of the former is to be achieved with respect to the latter.

The bushing 18 also includes a rearward portion 24. The ball rod 14 passes through the rearward portion 24 of the bushing 18 so as to likewise be slidably journalled therein. As viewed in FIG. 1, the rearward portion 24 includes a pair of support arms 26. The support arms 26 are sized to receive a drive rod 28 therein. Specifically, the drive rod 28 is snap-fit into the rearward portion 24 via the support arms 26.

In operation, when drive rod 28 is rotated in a particular direction, the ball rod 14 is moved axially rearwardly away from the bushing 18 such that the ball rod 14, and the ball element 16 thereof, are now disposed in a retracted position. Optionally, when the drive rod 28 is rotated in the opposite direction, the ball rod 14 is moved axially forwardly toward the bushing 18 such that the ball rod 14, and the ball element 16 thereof, are now disposed in an extended position. It should be understood that there are numerous positions between fully retracted and fully extended which are attainable depending upon the amount of rotation imparted to the drive rod 28.

In the exemplary embodiment, the assembly 10 includes four hinge assemblies 12. Optionally, the assembly 10 may include two or more hinges assemblies based on the desired application. In the exemplary embodiment, the hinge assemblies 12 are fabricated as a unitary component during the molding process. The vestiges or molding gates formed in each hinge may then be "broken" to form the four hinge assemblies illustrated in FIG. 1. Optionally, the hinge assemblies 12 may be fabricated separately and then coupled together.

Figure 2:
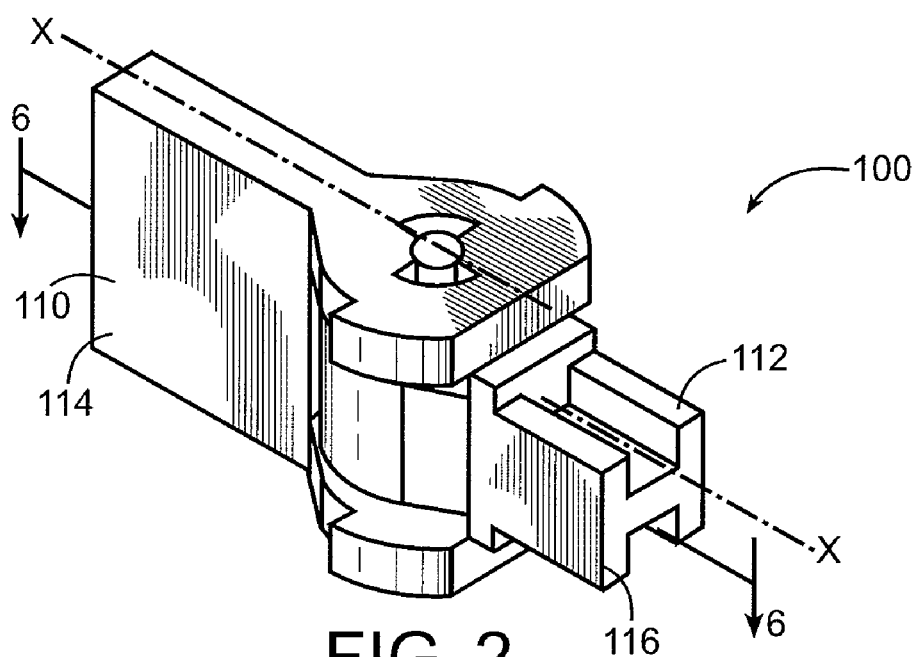
FIG. 2 is a perspective view of an exemplary hinge assembly in accordance with an embodiment of the present invention.
Figure 3:
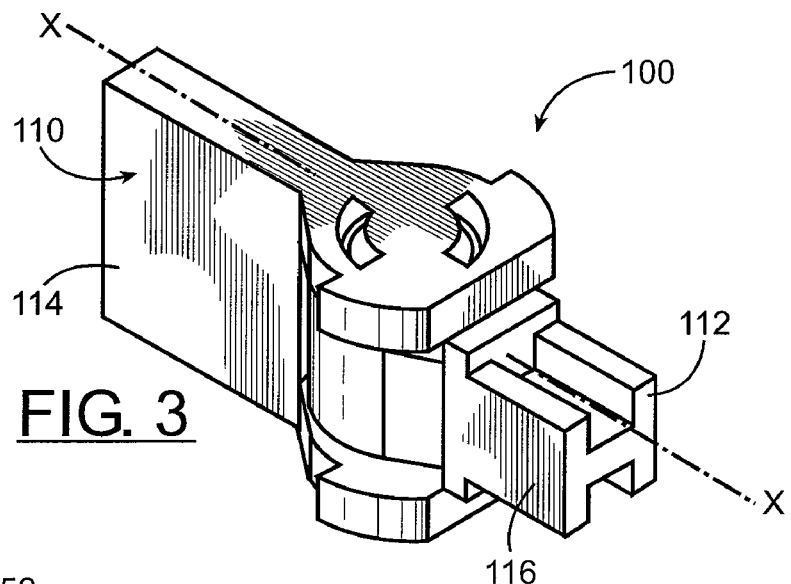
FIG. 3 is a bottom perspective view of the exemplary hinge assembly shown in FIG. 2.

FIG. 2 is a top perspective view of an exemplary hinge assembly 100 that may utilized in lieu of hinge assemblies 12 shown in FIG. 1 in accordance with one embodiment of the present invention. FIG. 3 is a bottom perspective view of the exemplary hinge assembly 100. FIGS. 2 and 3 also illustrate hinge assembly 100 in a molding position. Specifically, the molding position illustrates the position of hinge assembly 100 during the molding process. In the exemplary embodiment, the hinge assembly 100 includes a male portion 110 and a female portion 112 that is configured, during operation, to be rotatably coupled to the male portion 110. As discussed above, the hinge assembly 100 is fabricated from a plastic material as a unitary structure, as such, both the male portion 110 and female portion 112, and all components included in each, are fabricated as part of the unitary structure of hinge assembly 100.

In the molding position, the male portion 110 is aligned with the female portion 112 along a common axis, shown in FIGS. 2 and 3 as the X-axis. The male portion 110 includes an attachment member 114. The female portion includes an attachment member 116. In use, the attachment members 114 and 116 are utilized to couple hinge assembly 100 between two components that are desired to be hinged together. For example, referring again to FIG. 1, at least some of attachment members 114 and 116 are utilized to couple adjacent hinge assemblies 100 together. Optionally, the attachment members 114 and 116 are utilized to couple the hinge assembly 100 to the overall assembly 10 shown in FIG. 1. The shape and size of attachment members 114 and 116 shown in the figures is exemplary only. It should therefore be realized that the shape of attachment member 114 and 116 may conform to any desired shape that is useful in either coupling hinge assemblies together or coupling the hinge assemblies to some other larger assembly.

Figure 4:
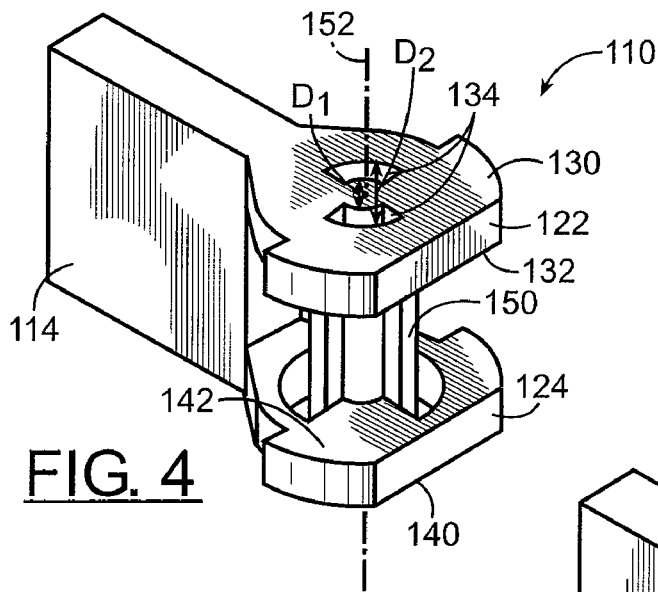
FIG. 4 is a top perspective view of a portion of the hinge assembly shown in FIGS. 2 and 3 in accordance with an embodiment of the present invention.
Figure 5:
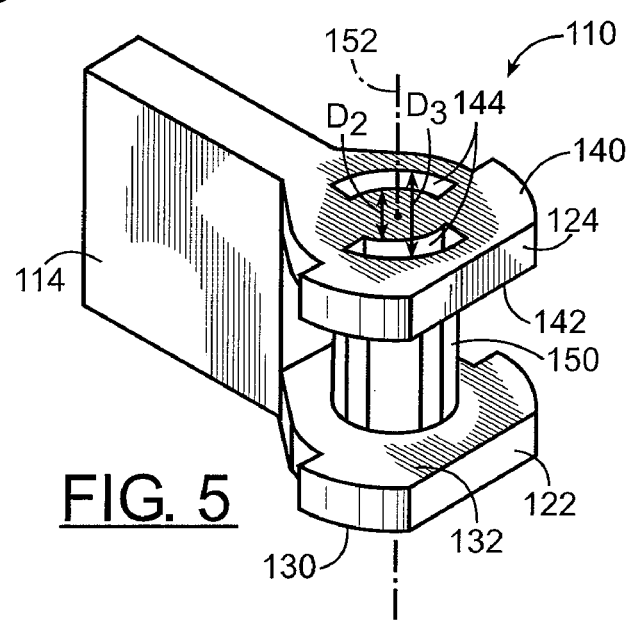
FIG. 5 is a bottom perspective view of the hinge portion shown in FIG. 4.

FIG. 4 is a top perspective view of the male portion 110 in accordance with an embodiment of the present invention. FIG. 5 is a bottom perspective view of the male portion 110 shown in FIG. 4. As shown in FIGS. 4 and 5, the male portion 110 includes the attachment member 114, a first flange 122, a second flange 124, and a swivel shaft 150 extending between the first and second flanges 122 and 124. The first and second flanges 122 and 124 are disposed at opposite sides of the attachment member 114.

As shown in FIGS. 4 and 5, the attachment member 114 and the first and second flanges 122 and 124 define a substantially U-shaped opening that is sized to receive the female portion 112 therein. The first flange 122 includes an outer surface 130, an opposing inner surface 132 and a plurality of openings 134 extending between the outer and inner surfaces 130 and 132, respectively. As will be discussed below, the openings 134 are formed during the molding procedure. In the exemplary embodiment, the first flange 122 has two openings 134 extending therethrough.

The second flange 124 includes an outer surface 140, an opposing inner surface 142 and a plurality of openings 144 extending between the outer and inner surfaces 140 and 142, respectively. As will be discussed below, the openings 144 are formed during the molding procedure. In the exemplary embodiment, the second flange 124 has two openings 144 extending therethrough.

As discussed above, the first flange 122 includes a plurality of openings 134 and the second flange 124 includes a plurality of openings 144 shown in FIGS. 2 and 3. The openings 134 each have an arcuate shape and include an inner diameter $D_1$ and an outer diameter $D_2$. Moreover, the openings 144 each have an arcuate shape and include an inner diameter $D_2$ and an outer diameter $D_3$. More specifically, as shown in FIGS. 2 and 3, the outer diameter $D_2$ of openings 134 is approximately equal to the inner diameter $D_2$ of openings 144. Moreover, each of openings 134 and 144 has a length 136 that extends 90 degrees from the X axis to the Y axis about a centerline axis 152 as shown in FIG. 6.

The hinge assembly 100 also includes the swivel shaft 150 extending between the first and second flanges 122 and 124. The swivel shaft 150 is formed unitarily with the first and second flanges 122 and 124. The swivel shaft 150 is centered on a rotational axis 152 of the hinge assembly 100. During operation, the female portion 112 rotates around the swivel shaft 150. Specifically, the female portion 112 circumscribes the swivel shaft, shown in FIGS. 1 and 2, to enable the hinge assembly 100 to move during operation.

Figure 6:
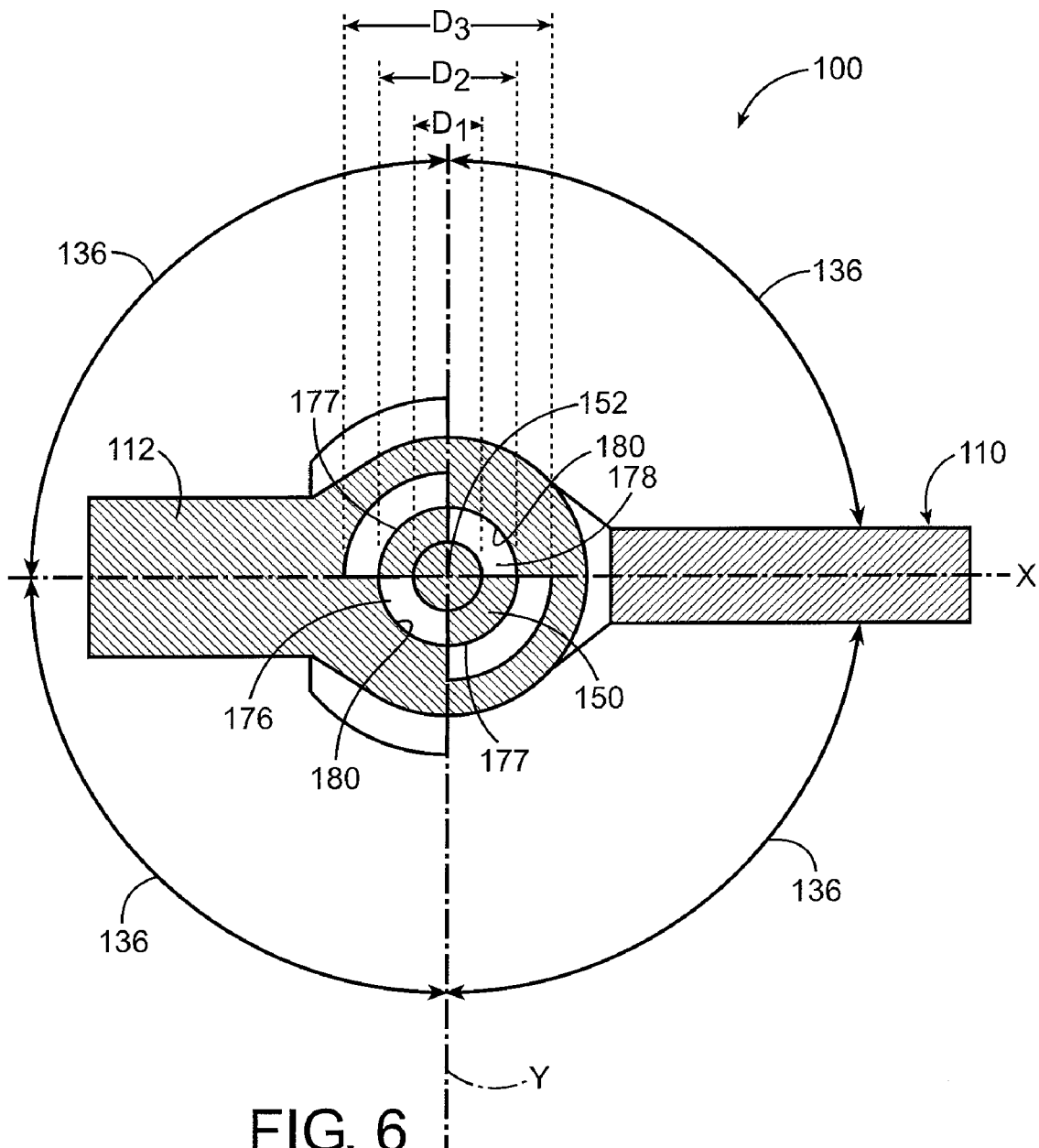
FIG. 6 is a top sectional view of the hinge assembly shown in FIGS. 2 and 3 in accordance with an embodiment of the present invention.

FIG. 6 is a sectional view of the hinge assembly 100 shown in FIG. 2 in the molding position in accordance with an embodiment of the present invention. The swivel shaft 150 has a cross-sectional profile that is defined by the diameters of both the first and second set of openings 134 and 144, respectively. More specifically, the swivel shaft has an outer diameter $D_2$ that is approximately the same as the outer diameter $D_2$ of openings 134 and is approximately equal to the inner diameter $D_2$ of openings 144.

The swivel shaft 150 also includes a first cavity 176 or channel defined radially inward from an outer surface 177 of the swivel shaft 150 and a second cavity 178 that is disposed radially opposite from first cavity 176. In the exemplary embodiment, the first and second cavities 176 and 178 extend along the Z-axis or rotational axis of the swivel shaft 150 approximately the length of the swivel shaft 150. More specifically, the first and second cavities 176 and 178 extend between the inner surfaces 132 and 142 of the first and second flanges 122 and 124, respectively as shown in FIGS. 2 and 3. As such a radially outer edge 180 of each of cavities 176 and 178 is radially aligned with the radially outer surface 177 of the swivel shaft 150. Moreover, each of cavities 176 and 178 extend between the first flange 122 and the second flange 124 shown in FIGS. 4 and 5.

Figure 7:
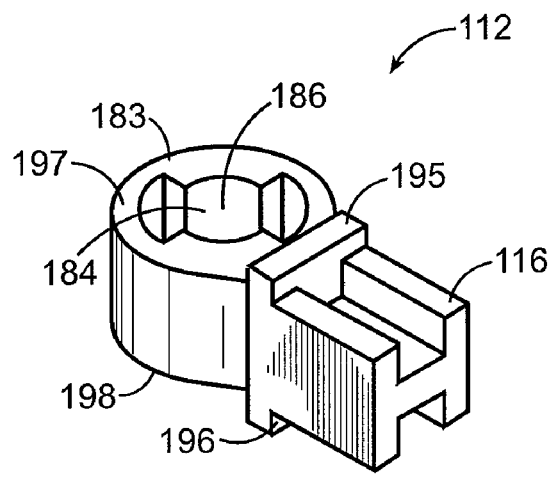
FIG. 7 is a perspective view of another portion of the hinge assembly shown in FIGS. 2 and 3 in accordance with an embodiment of the present invention.
Figure 8:
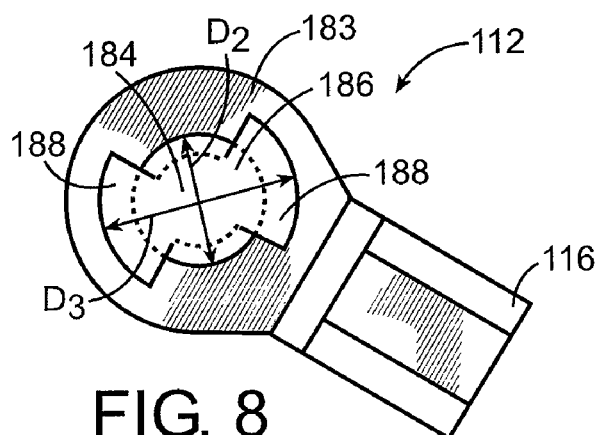
FIG. 8 is a top view of the hinge portion shown in FIG. 7.

FIG. 7 is a perspective view of the female portion 112 shown in FIGS. 2 and 3 in accordance with an embodiment of the present invention. FIG. 8 is a top view of the female portion 112. The female portion 112 includes a body 183 and the attachment member 116 formed unitarily with the body 183. The female portion 112 has a single opening 184 extending through the body 183. The opening 184 includes a central opening 186 and two butterfly or peripheral openings 188 that combine to form the opening 184. The size of opening 184 enables the female portion 112 to rotate around the swivel shaft 150. As such, the central opening 186 has a diameter $D_2$ that is approximately equal to the diameter of a swivel shaft 150. The peripheral openings 188 each have an inner diameter $D_2$ and an outer diameter $D_3$. As such, the peripheral openings 188 each define an opening that is equal to the openings 144 shown in FIG. 5. Therefore, the inner and outer diameters $D_2$ and $D_3$ of the peripheral openings 188 are the same as the inner and outer diameters of the second two openings 144 extending through the second flange 124. More specifically, the size of the peripheral openings 188 is substantially identical to the size of openings 144 shown in FIG. 6. Additionally, in the molding position shown in FIGS. 1 and 2, openings 188 are substantially aligned with openings 144 along the Y axis.

As shown in FIG. 7, the female portion 112 also includes a pair of tabs 195 and 196 that extend radially outward from an upper and lower surface 197 and 198 of the female portion 112. The outer surface of the tab 195 is approximately coplanar with the inner surface 132 of the first flange 122 and the outer surface of the tab 196 is approximately coplanar with the inner surface 142 of the second flange 124 each shown in FIGS. 4 and 5. As such, a width of the attachment member 116 including the tabs 195 and 196 is approximately equal to a distance defined between the first and second flanges 122 and 124 such that, during operation, at least a portion, i.e. tabs 195 and 196, of the female portion 112 is friction fit within the male portion 110.

Figure 9:
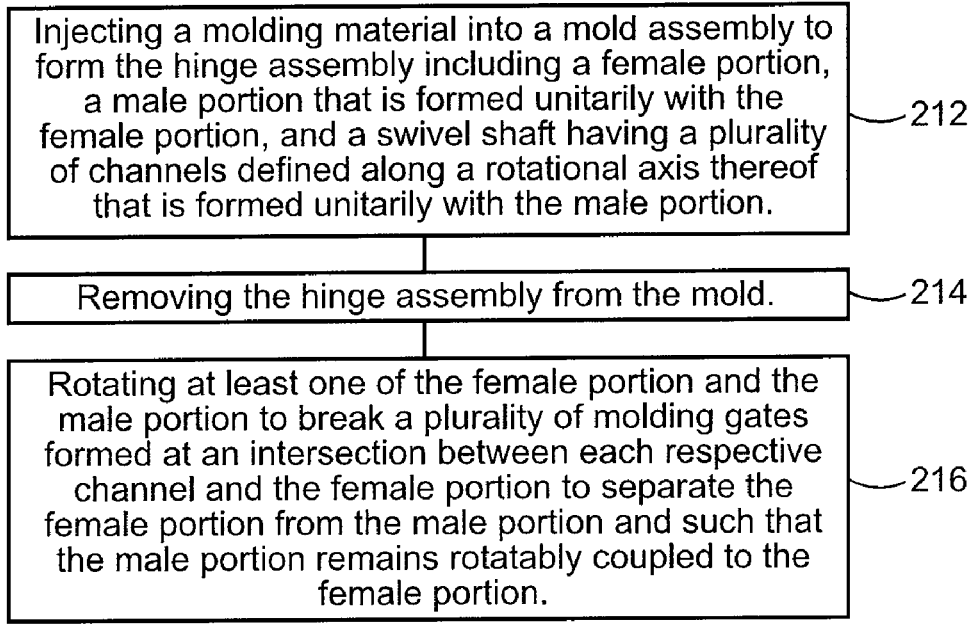
FIG. 9 illustrates an exemplary method of fabricating an exemplary hinge assembly in accordance with an embodiment of the present invention.

FIG. 9 is a method 210 of fabricating a hinge assembly. The method includes injecting 212 a molding material into a mold assembly to form the hinge assembly including a female portion, a male portion that is formed unitarily with the female portion, and a swivel shaft having a plurality of channels defined along a rotational axis thereof that is formed unitarily with the male portion. The method also includes removing 214 the hinge assembly from the mold, and rotating 216 at least one of the female portion and the male portion to break a plurality of molding gates formed at an intersection between each respective channel and the female portion to separate the female portion from the male portion and such that the male portion remains rotatably coupled to the female portion.

For example, during initial fabrication, the quantity of openings 134 and 144 is determined. In the exemplary embodiment, the hinge assembly 100 includes four openings, two openings 134 and two openings 144. A circle is divided into sectors based on the quantity of openings desired. In the exemplary embodiment, shown in FIG. 6, the circle is divided into four sectors, each sector extending 90 degrees. As such each of openings 134 extend radially 90 degrees around center axis 152 and each of openings 144 extend 90 degrees around axis 152. Moreover, each of openings 134 is disposed between adjacent openings 144 and disposed radially inward from openings 144, as discussed above. It should be realized that each of openings 134 and 144 are formed during the molding process. More specifically, the mold used to form hinge assembly 100 (not shown) includes mold portions (not shown) that are the equivalent size of openings 134 and 144. As such, when the molding process is completed, the mold is broken or removed, and the resulting openings 134 and 144 are formed. The resulting swivel hinge assembly 100 generally cannot be disassembled without destroying swivel hinge assembly 100.

Figure 10:
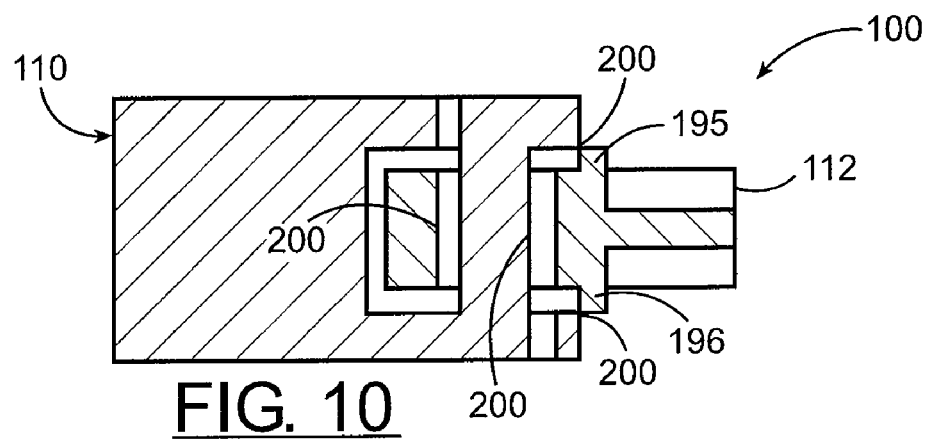
FIG. 10 illustrates a cross-sectional view of the exemplary hinge assembly shown in FIGS. 2 and 3 in accordance with an embodiment of the present invention.

For example, FIG. 10 illustrates a cross-sectional view of the exemplary hinge assembly 100 in the molding position in accordance with an embodiment of the present invention. During the molding process, common molding gates are formed at an intersection between the openings 134 and 144 shown in FIG. 6. This initially results in vestiges 200 being formed between the openings 134 and 144 shown in FIG. 6 and between the tabs 195 and 196 and first and second flange members 122 and 124, respectively. The vestiges 200 run parallel to axis of rotation of hinge assembly 100 to allow for closer tolerances to be formed between the male portion 110 and the female portion 112. This initially results in an integral piece. However, the molding gates or vestiges 200 are broken by rotating female portion 112 with respect to the male portion 110 resulting in swivel hinge assembly 100.

Figure 11:
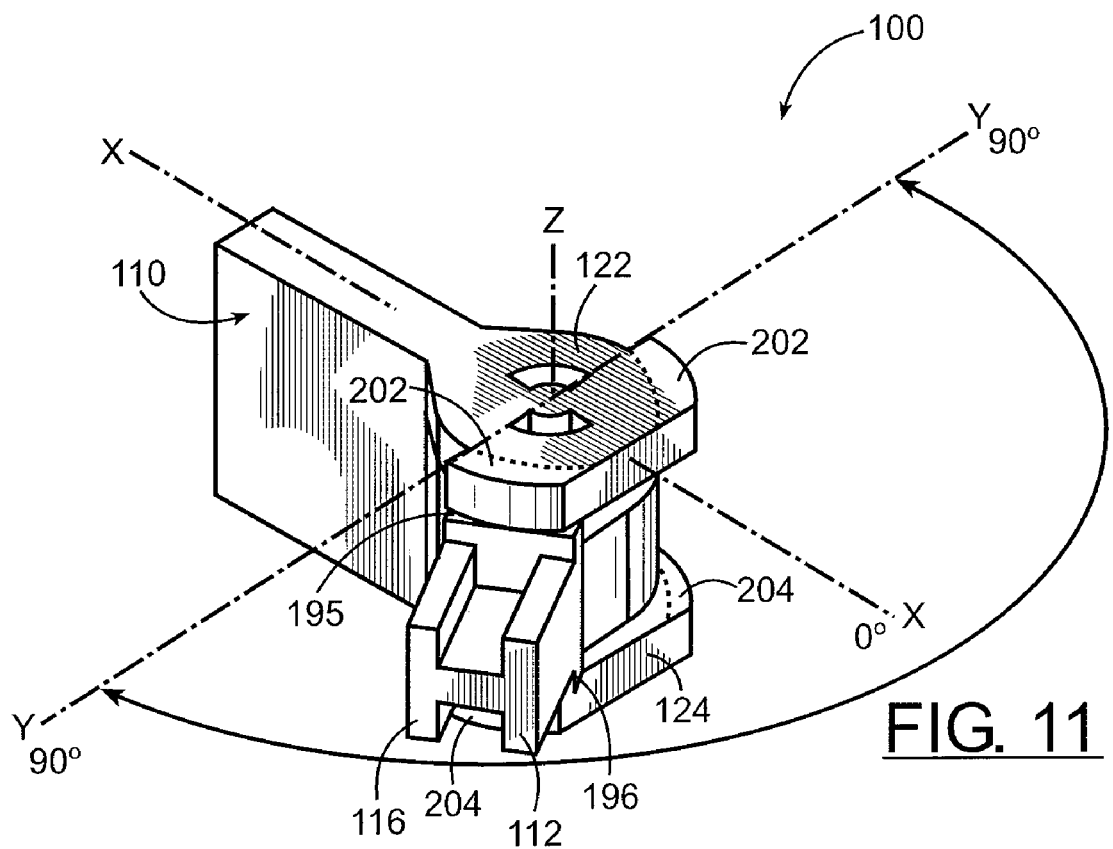
FIG. 11 illustrates a perspective view of the exemplary hinge assembly shown in FIGS. 2 and 3 in an exemplary operational position in accordance with an embodiment of the present invention.

As shown in FIG. 11, the hinge assembly 100 is configured to rotate in an operational range between approximately 0 degrees and approximately 90 degrees in two axial directions, wherein 0 degrees is defined as the molding position and any radial movement beyond 0 degrees is defined as the operational position. As shown in FIG. 11, hinge assembly 100 also includes two pairs 202 and 204 of retainers that are formed unitarily with the first and second flanges 122 and 124, respectively. In operation, when the female portion 112 is rotated from the molding position, i.e. the female portion 112 is approximately parallel to the male portion 110, the tabs 195 and 196 pass between the pairs of retainers 202 and 204. Since the width of attachment member 116 including tabs 195 and 196 is approximately equal to a distance defined between the retainers 202 and 204, during operation, the female portion 112 is friction fit between the retainers 202 and 204. This friction fit reduces movement in the Z-direction between the male portion 110 and the female portion 112 enabling the hinge to withstand increased torque.

Hinge assembly 100 is molded as a unitary hinge assembly that can achieve hinge function after breaking its molding gates or vestiges 200 in such a way that once it leaves its molding position, the male portion 110 is friction fit with the female portion 112. The hinge assembly 100 is molded such that there is relatively no movement in the Z-direction between the male portion 110 and the female portion 112. The tab features 195 and 196 formed on the female portion 112 are constrained by the retainers 202 and 204 formed on the male portion 110 so that the axial direction movement is also restricted. With up to 180 degrees of working swivel angle, hinge assembly 100 has no movement between each other in the Z-axis direction or in the radial directions.

Figure 12:
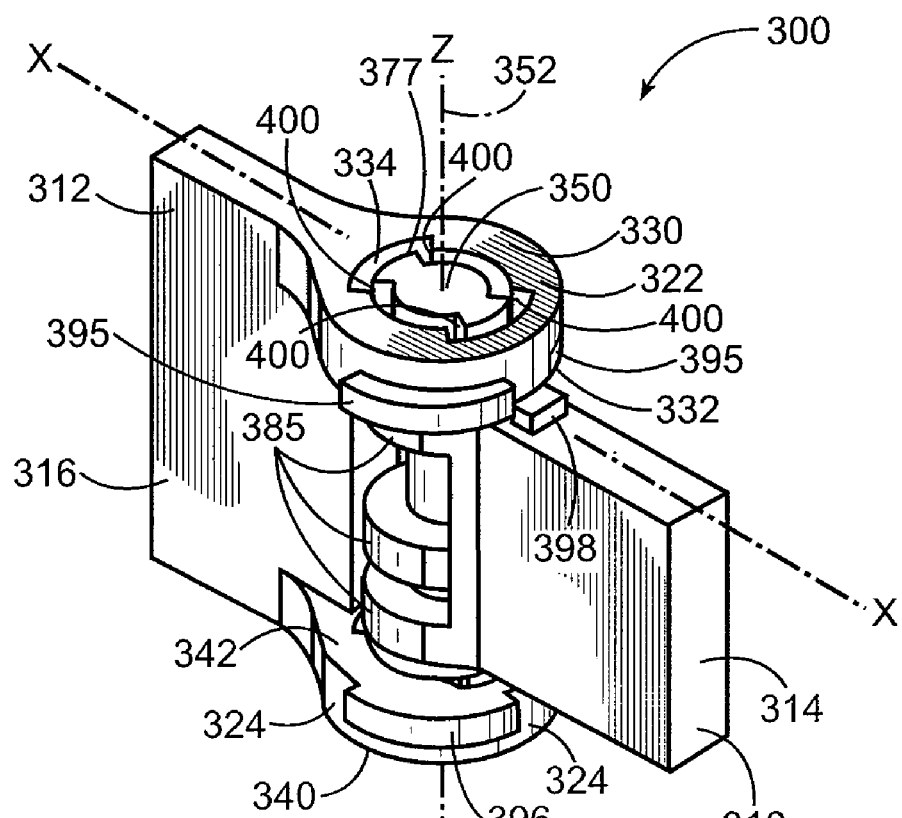
FIG. 12 is a perspective view of another exemplary hinge assembly in accordance with an embodiment of the present invention.
Figure 13:
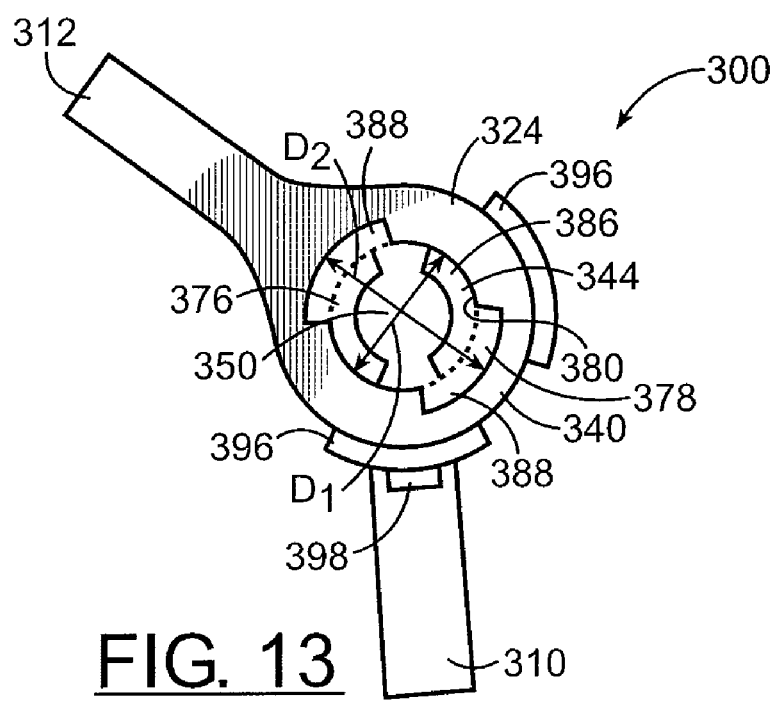
FIG. 13 is a bottom view of the hinge assembly shown in FIG. 12.

FIG. 12 is a top perspective view of an exemplary hinge assembly 300 that may utilized in lieu of hinge assemblies 12 shown in FIG. 1 in accordance with one embodiment of the present invention. FIG. 13 is a bottom view of the exemplary hinge assembly 300 shown in FIG. 12. FIG. 12 illustrates hinge assembly 300 in a molding position as discussed above. FIG. 13 illustrates hinge assembly 300 in an exemplary operational position as discussed above.

In the exemplary embodiment, the hinge assembly 300 includes a male portion 310 and a female portion 312 that is rotatably coupled to the male portion 310. As discussed above, the hinge assembly 300 is fabricated from a plastic material as a unitary structure, as such, both the male portion 310 and female portion 312, and all components included in each, are fabricated as part of the unitary structure of hinge assembly 300.

In the molding position, the male portion 310 is aligned with the female portion 312 along a common axis, shown in FIG. 12 as the X-axis. The hinge assembly male portion 310 includes an attachment member 314. The female portion 312 includes an attachment member 316. In use, the attachment members 314 and 316 are utilized to couple hinge assembly 300 between two components that are desired to be hinged together as discussed above. It should therefore be realized that the shape of attachment members 314 and 316 may conform to any desired shape that is useful in either coupling hinge assemblies together or coupling the hinge assemblies to some other large assembly.

The female portion 312 includes the attachment member 316, a first flange 322, and a second flange 324. The attachment member 316 and the first and second flanges 322 and 324 define a substantially U-shaped opening that is sized to receive the male portion 310 therein. The first flange 322 includes an outer surface 330, an opposing inner surface 332 and a single opening 334 extending between the outer and inner surfaces 330 and 332, respectively. The second flange 324 includes an outer surface 340, an opposing inner surface 342 and a single opening 344 extending between the outer and inner surfaces 340 and 342, respectively. Both openings 334 and 344 are formed during the molding process as discussed below.

As discussed above, the first flange 322 includes the opening 334 and the second flange 324 includes the opening 344. Each of openings 334 and 344 include a central opening 386 and two peripheral openings 388. The central opening 384 has a diameter $D_1$ that is equal to a diameter of the swivel shaft discussed below. The size of opening 386 enables the male portion 310, including the swivel shaft 350 to rotate within openings 334 and 344. The peripheral openings 388 each have an inner diameter $D_1$ and an outer diameter $D_2$, wherein $D_2 > D_1$.

The female portion 312 also includes two pairs of retainers 395 and 396. The first pair of retainers 395 extends radially outward from the first flange 322 and the second pair of retainers 396 extends radially outward from the second flange 324. The radially inner surface of each pair of retainers 395 and 396 is approximately coplanar with the radially outer surface of a pair of tabs 398 mounted on the male portion 310. As such, a width of attachment member 314 including tabs 398 is approximately equal to a distance defined between the radially inner surfaces of the pair of retainers 395 and 396 such that, during operation, the male portion 310 is friction fit with the female portion 312.

The male portion 310 includes the swivel shaft 350 that extends through the first and second flanges 322 and 324. The swivel shaft 350 is centered on a rotational axis 352 of the hinge assembly 300 and functions as the central axis of movement between the male portion 310 and the female portion 312. Specifically, the first and second flanges 322 and 324 of the female portion 312 each circumscribe the respective ends of swivel shaft 350.

The swivel shaft 350 also includes a first cavity 376 or channel defined radially inward from an outer surface 377 of the swivel shaft 350 and a second cavity 378 that is disposed radially opposite from first cavity 376. In the exemplary embodiment, the first and second cavities 376 and 378 extend along the Z-axis or rotational axis of the swivel shaft 350 approximately the length of each respective opening 334 and 344 in which the swivel shaft 150 ends are inserted. More specifically, the first and second cavities 376 and 378 extend between the inner and outer surfaces of each respective opening 334 and 344. As such, a radially outer edge 380 of each of cavities 376 and 378 is radially aligned with the radially outer surface 377 of the swivel shaft 350.

In the exemplary embodiment, the swivel shaft 350 also includes a plurality of rings 385 extending radially outward from the swivel shaft 350. As shown in FIG. 12, the rings 385 are disposed between the radially inner surfaces of first and second flanges 322 and 324. In operation, the rings 385 increase the stiffness of swivel shaft 350 to enable an increase torque to be applied to hinge assembly 300.

During the molding process, common molding windows 400 are formed at an intersection between the openings 334 and 344 and the swivel shaft 350, respectively. This initially results in vestiges being formed at the intersections between the openings 334 and 344 and the swivel shaft 350. Vestiges 400 may also be formed between the tabs 398 and the retainers 395 and 396, respectively. The vestiges 400 run parallel to axis of rotation of hinge assembly 300 to enable closer tolerances between the male portion 310 and the female portion 312. This initially results in an integral piece. The molding gates or vestiges 400 are broken by rotating female portion 312 with respect to the male portion 310 resulting in swivel hinge assembly 300.

As shown in FIG. 13, the hinge assembly 300 is configured to rotate in an operational range between approximately 0 degrees and approximately 90 degrees in two axial directions. For example, as shown in FIG. 13, hinge assembly 300 when the female portion 312 is rotated from the molding position, i.e. the female portion 312 is approximately parallel to the male portion 310 along the X-axis, the tabs 398 pass between the retainers 395 and 396. Since the width of attachment member 314 including tabs 398 is approximately equal to a distance defined between the retainers 395 and 396, during operation, the female portion 312 is friction fit between the retainers 395 and 396 in the operating positions. This friction fit reduces movement in the Z-direction between the male portion 310 and the female portion 312 enabling the hinge to withstand increased torque.

Figure 14:
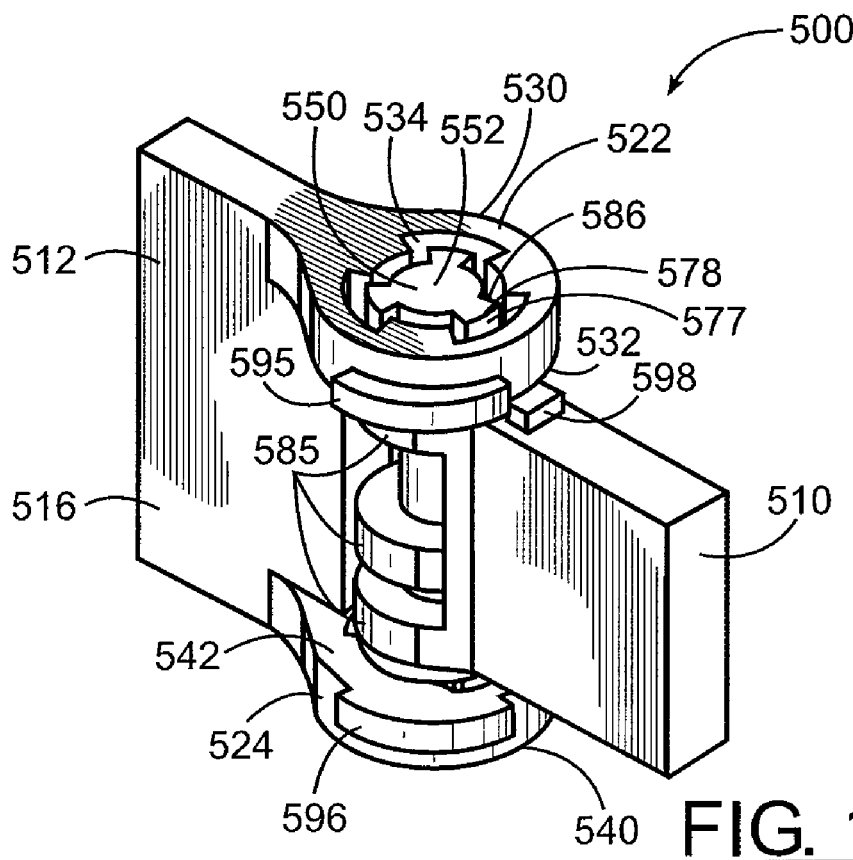
FIG. 14 is a perspective view of another exemplary hinge assembly in accordance with an embodiment of the present invention.
Figure 15:
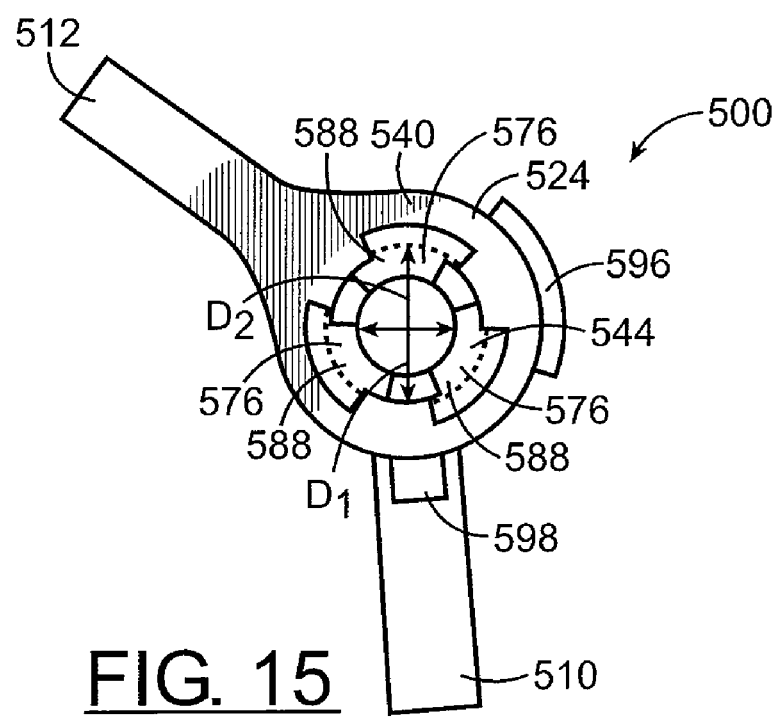
FIG. 15 is a bottom view of the hinge assembly shown in FIG. 14.

FIG. 14 is a top perspective view of an exemplary hinge assembly 500 that may utilized in lieu of hinge assemblies 12 shown in FIG. 1 in accordance with one embodiment of the present invention. FIG. 15 is a bottom view of the exemplary hinge assembly 500 shown in FIG. 14. FIG. 14 illustrates hinge assembly 500 in a molding position as discussed above. FIG. 15 illustrates hinge assembly 500 in an exemplary operation position as discussed above.

Hinge assembly 500 is substantially similar to hinge assembly 300 shown in FIGS. 12 and 13. In the exemplary embodiment, the hinge assembly 500 includes a male portion 510 and a female portion 512 that is rotatably coupled to the male portion 510. As discussed above, the hinge assembly 500 is fabricated from a plastic material as a unitary structure, as such, both the male portion 510 and female portion 512, and all components included in each, are fabricated as part of the unitary structure of hinge assembly 500.

The female portion 512 includes the attachment member 516, a first flange 522, and a second flange 524. The attachment member 516 and the first and second flanges 522 and 524 define a substantially U-shaped opening that is sized to receive the male portion 510 therein. The first flange 522 includes an outer surface 530, an opposing inner surface 532 and a single opening 534 extending between the outer and inner surfaces 530 and 532, respectively. The second flange 524 includes an outer surface 540, an opposing inner surface 542 and a single opening 544 extending between the outer and inner surfaces 540 and 542, respectively. Both openings 534 and 544 are formed during the molding process as discussed below.

Each of openings 534 and 544 include a central opening 586 and three peripheral openings 588. The central opening 586 has a diameter $D_1$ that is equal to a diameter of the swivel shaft discussed below. The size of the central opening 586 enables the male portion 510, including the swivel shaft 550 to rotate within openings 534 and 544. The peripheral openings 588 each have an inner diameter $D_1$ and an outer diameter $D_2$, wherein $D_2 > D_1$.

The female portion 512 also includes two pairs of retainers 595 and 596. A first pair of retainers 595 extends radially outward from the first flange 522 and the second pair of retainers 596 extends radially outward from the second flange 524. The radially inner surface of each pair of retainers 595 and 596 is approximately coplanar with the radially outer surface of a pair of tabs 598 mounted on the male portion 510. As such, a width of the male member 510 including tabs 598 is approximately equal to a distance defined between the radially inner surfaces of the pair of retainers 595 and 596 such that, during operation, the male portion 510 is friction fit with the female portion 512.

The male portion 510 includes the swivel shaft 550 that extends through the first and second flanges 522 and 524. The swivel shaft 550 is centered on a rotational axis 552 of the hinge assembly 500 and functions as the central axis of movement between the male portion 510 and the female portion 512. Specifically, the first and second flanges 522 and 524 of the female portion 512 each circumscribe the respective ends of swivel shaft 550.

The swivel shaft 550 also includes three cavities 576 defined radially inward from an outer surface 577 of the swivel shaft 550. In the exemplary embodiment, the cavities 576 extend along the Z-axis or rotational axis of the swivel shaft 550 approximately the length of each respective opening 534 and 544 in which the swivel shaft 550 ends are inserted.

In the exemplary embodiment, the swivel shaft 550 also includes a plurality of rings 585 extending radially outward from the swivel shaft 550. As shown in FIG. 14, the rings 585 are disposed between the radially inner surfaces of first and second flanges 522 and 524. In operation, the rings 585 increase the stiffness of swivel shaft 550 to enable an increase torque to be applied to hinge assembly 500.

Described herein is a plurality of molded hinge assemblies that are fabricated using an injection molding process. Although the invention has been described in connection with a headlight adjuster mechanism, the embodiments of the invention are capable of use in other applications, and a headlight adjuster is merely shown and described as an example of one such application.

The hinge assemblies each includes a male portion and a female portion that is formed unitarily with the male portion. The hinge assemblies each include tabs that align with respective retainers to prevent or minimize movement in the axial direction between the female portion and the male portion. To prevent or minimize movement in the radial direction, the outer surface of the male portion mates with the inner surface of the female portion. The various embodiments provide, among other things, alternative working ranges for the hinges. The hinge assemblies are molded in one part but can achieve hinge function after breaking its molding gates and vestiges in a way such that once it leaves its molding position, the male part will be engaged with the corresponding female counterpart, and there is minimal movement between them in radial direction.

In one embodiment, the male portion includes sector-shaped holes that are mirrored to each other by a line through their co-radial center. The sector-shaped holes are offset by approximately 90 degrees. The female portion also includes sector-shaped holes that are offset from the male portion sector-shaped holed by 90 degrees. As such, all four sector holes are 90 degrees apart and the outer diameter of the first pair of sector holes is equal to the inner diameter of second pair of sector holes. The inner surface of the first pair of holes is co-planar with the outer surface of the swivel shaft. The male portion also includes two flanges and a pair to tabs. The top surface of a first tab is coplanar with the inner surface of a first flange and the top surface of a second tab is coplanar with the inner surface of the second flange. The inner diameter of the female portion is equal to the outer diameter of the swivel shaft.

In another embodiment, referred to as the Double D shaped hinge assembly, the female portion includes a pair of flanges each having an opening extending therethrough. The male portion, including the swivel shaft, is inserted through and maintained within the openings. The swivel shaft includes two channels and the openings each include two respective peripheral openings. The outer diameter of the swivel shaft is equal to the inner diameter of the openings. A pair of tabs can be rotated between the flanges and will be engaged between them, restraining the movement of male portion in the axial direction. When the male portion is rotated with respect to the female portion, the diameter of the swivel shaft is sufficient such that the outer surface of the swivel shaft engages with the inner surface of the opening, restraining the movement of male portion.

In another embodiment, referred to as the triangle-shaped hinge assembly, the female portion includes a pair of flanges each having an opening extending therethrough. The male portion, including the swivel shaft, is inserted through and maintained within the openings. The swivel shaft includes three channels and the openings each include three respective peripheral openings. The outer diameter of the swivel shaft is equal to the inner diameter of the openings. A pair of tabs can be rotated between the flanges and will be engaged between them, restraining the movement of male portion in the axial direction. When the male portion is rotated with respect to the female portion, the diameter of the swivel shaft is sized such that the outer surface of the swivel shaft engages with the inner surface of the opening, restraining the movement of male portion.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A molded hinge assembly comprising:
   a male portion;
   a female portion formed unitarily with the male portion;
   a swivel shaft formed unitarily with the male portion, the swivel shaft including a plurality of channels defined along a rotational axis thereof; and
   a plurality of molding gates formed at an intersection between each respective channel and the female portion, the female portion being subsequently rotatable with respect to the male portion after the molding gates are broken.

2. A molded hinge assembly in accordance with claim 1, wherein said swivel shaft is friction fit within the female portion after the subsequent rotation of the female portion.

3. A molded hinge assembly in accordance with claim 1 wherein said male portion comprises:
   a first flange;
   a second flange; and
   a base member formed unitarily with the first and second flanges, the female portion is journaled for rotation between the first and second flanges.

4. A molded hinge assembly in accordance with claim 3, wherein the first and second flanges are separated by a distance, and the female portion has a thickness that is approximately equally to the distance defined between the first and second flanges such that during operation, the female portion is friction fit with the male portion.

5. A molded hinge assembly in accordance with claim 3, wherein the first flange comprises a first pair of arcuate openings extending therethrough, the first pair of openings having a cross-sectional profile that is substantially similar to a cross-sectional profile of the channels.

6. A molded hinge assembly in accordance with claim 5 wherein the second flange comprises a second pair of arcuate openings extending therethrough, the second pair of openings having an inner diameter that is approximately equal to the outer diameter of the first pair of openings.

7. A molded hinge assembly in accordance with claim 6, wherein each of the openings in the first pair of openings is offset from each of the openings in the second pair of openings by approximately ninety degrees.

8. A molded hinge assembly in accordance with claim 1, wherein the female portion comprises an opening extending therethrough, the opening comprising a central opening and a pair of peripheral openings, the molding gates are formed at an intersection between each respective channel and the peripheral openings.

9. A molded hinge assembly in accordance with claim 8, wherein the peripheral openings have an inner diameter that is approximately equal to an outer diameter of the swivel shaft.

10. A molded hinge assembly in accordance with claim 1, wherein the male portion comprises a pair of retainers and the female portion comprises a pair of tabs, the pair of tabs are sized to pass between the retainers such that the female portion is friction fit with the male portion during operation.

11. A molded hinge assembly in accordance with claim 1, wherein the female portion comprises:

a base member,
a first flange having an opening extending therethrough; and
a second flange having an opening extending therethrough, the swivel shaft is journaled for rotation within the first and second flange openings.

12. A molded hinge assembly in accordance with claim 11, wherein the swivel shaft comprises two said channels defined along a rotational axis thereof.

13. A molded hinge assembly in accordance with claim 11, wherein the swivel shaft comprises three said channels defined along a rotational axis thereof.

14. A molded hinge assembly in accordance with claim 11, wherein the female portion comprises a pair of retainers and the male portion comprises a pair of tabs, the pair of tabs are sized to pass between the retainers such that the female portion is friction fit with the male portion during operation.

15. A molded hinge assembly in accordance with claim 1, further comprising a second molded hinge assembly wherein the molded hinge assembly is subsequently rotatable with respect to a second molded hinge assembly after the molding gates are broken, the second molded hinge assembly comprising:
a second male portion, a second female portion, and a second swivel shaft formed unitarily with the second male portion, the second swivel shaft including a plurality of channels defined along a rotational axis thereof, and a plurality of molding gates formed at an intersection between each respective channel and the second female portion.

16. A molded hinge assembly in accordance with claim 15 further comprising a ball rod coupled to the first and second hinge assemblies, the ball rod is adapted to be seated within a ball-type pocket or recess defined within a vehicular headlamp housing and imparts the desired adjustment to the headlamp housing as the ball rod is moved in either one of two linear directions.

17. A molded hinge assembly in accordance with claim 1 wherein the male portion comprises:
a first flange having a first pair of arcuate openings extending therethrough, the first pair of openings having a cross-sectional profile that is substantially similar to a cross-sectional profile of the channels;
a second flange having a second pair of arcuate openings extending therethrough, the second pair of openings having an inner diameter that is approximately equal to the outer diameter of the first pair of openings; and
a base member formed unitarily with the first and second flanges, the female portion is journaled for rotation between the first and second flanges.

18. A molded hinge assembly in accordance with claim 1 wherein the female portion comprises:
a first flange having an opening extending therethrough; and
a second flange having an opening extending therethrough; and
a base member formed unitarily with the first and second flanges, the swivel shaft is journaled for rotation within the first and second flange openings.

19. A method of fabricating a molded hinge assembly, said method comprising:
injecting a molding material into a mold assembly to form the hinge assembly including a female portion, a male portion that is formed unitarily with the female portion, and a swivel shaft having a plurality of channels defined along a rotational axis thereof that is formed unitarily with the male portion;
removing the hinge assembly from the mold; and
rotating at least one of the female portion and the male portion to break a plurality of molding gates formed at an intersection between each respective channel and the female portion to separate the female portion from the male portion and such that the male portion remains rotatably coupled to the female portion.

20. A method in accordance with claim 19 further comprising injecting a molding material into the mold assembly to form the hinge assembly including a female portion and a male portion that is inserted at least partially within the female portion.

21. A method in accordance with claim 19 further comprising injecting a molding material into a mold assembly to form a male portion that includes a first flange, a second flange, a base member formed unitarily with the first sand second flanges, and the swivel shaft formed between the first and second flanges.

22. A method in accordance with claim 21 further comprising forming a first pair of openings extending through the first flange, the first pair of openings having a cross-sectional profile that is substantially similar to a cross-sectional profile of the channels.

23. A method in accordance with claim 22 further comprising forming a second pair of openings extending through the second flange, the second pair of openings having an inner diameter that is approximately equal to an outer diameter of the first pair of openings.

24. A method in accordance with claim 23 further comprising forming the first and second pair of openings such that each opening in the first pair of openings is offset from each of the openings in the second pair of openings by approximately ninety degrees.

25. A method in accordance with claim 21 further comprising forming the male portion to include a pair of retainers, and forming the female portion to include a pair of tabs, the pair of tabs are sized to pass between the retainers such that the female portion is friction fit with the male portion during operation.

26. A method in accordance with claim 21 further comprising injecting a molding material into a mold assembly to form a female portion that includes a base member, a first flange having an opening extending therethrough, and a second flange having an opening extending therethrough, the swivel shaft is journaled for rotation within the first and second flange openings.

27. A method in accordance with claim 26 further comprising forming the swivel shaft to include two channels defined along a rotational axis thereof.

28. A method in accordance with claim 26 further comprising forming the swivel shaft to include three channels defined along a rotational axis thereof.

* * * * *